United States Patent
Pai et al.

(10) Patent No.: US 12,518,282 B2
(45) Date of Patent: Jan. 6, 2026

(54) USING LOCATION-BASED MAPPING TO ENABLE AUTOMATED INFORMATION TRANSFER AT A USER LOCATION

(71) Applicant: Capital One Services, LLC, McLean, VA (US)

(72) Inventors: Aditya Pai, Brooklyn, NY (US); Brice Elder, Allen, TX (US); Allison Fenichel, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 161 days.

(21) Appl. No.: 18/189,792

(22) Filed: Mar. 24, 2023

(65) Prior Publication Data

US 2024/0320674 A1    Sep. 26, 2024

(51) Int. Cl.
     *G06Q 20/40*      (2012.01)
(52) U.S. Cl.
     CPC ... *G06Q 20/40155* (2020.05); *G06Q 20/4093* (2013.01)
(58) Field of Classification Search
     CPC .............................................. G06Q 20/00–425
     See application file for complete search history.

(56) References Cited

U.S. PATENT DOCUMENTS

| | | | | |
|---|---|---|---|---|
| 10,304,042 | B2* | 5/2019 | Desai | G06Q 20/4015 |
| 2012/0084177 | A1* | 4/2012 | Tanaka | G06Q 30/0601 |
| | | | | 705/26.1 |
| 2019/0312883 | A1* | 10/2019 | McCarter | H04L 9/088 |
| 2020/0265412 | A1* | 8/2020 | Sandberg | H04W 12/63 |
| 2020/0387887 | A1 | 12/2020 | Rathod | |

OTHER PUBLICATIONS

International Search Report and Written Opinion for Application No. PCT/US2024/013342, mailed on Apr. 18, 2024, 11 pages.

* cited by examiner

*Primary Examiner* — Mohammad A. Nilforoush

(74) *Attorney, Agent, or Firm* — Harrity & Harrity, LLP

(57) ABSTRACT

In some implementations, an automated information transfer system may receive an indication of a location of the user device. The automated information transfer system may identify an interacting entity associated with the automated information transfer that is associated with a physical location that is within a threshold proximity of the location of the user device. The automated information transfer system may receive item-specific data associated with the automated information transfer. The automated information transfer system may identify one or more interaction terminals at the physical location associated with the interacting entity. The automated information transfer system may receive authorization information associated with the automated information transfer. The automated information transfer system may perform an action based on whether the authorization information indicates that the automated information transfer is at least one of authorized, conditionally authorized, not authorized, or conditionally not authorized.

20 Claims, 7 Drawing Sheets

USING LOCATION-BASED MAPPING TO ENABLE AUTOMATED INFORMATION TRANSFER AT A USER LOCATION

BACKGROUND

An automated information transfer system is a computer-based system that automates the transfer of information between and/or among various systems and/or devices. For example, an automated information transfer system often uses software to obtain information (e.g., data) from one system and/or device (e.g., a source system and/or device) and transfer the information to another system and/or device (e.g., a destination system and/or device). To enable the transfer of information from source system and/or device to a destination system and/or device, the automated information transfer system often uses the software to convert the information obtained from the source system and/or device into a format that is compatible with the destination system and/or device (e.g., to enable the destination system to use the information for various purposes).

SUMMARY

Some implementations described herein relate to a system for using location-based mapping to enable automated information transfer at a user location. The system may include one or more memories and one or more processors communicatively coupled to the one or more memories. The one or more processors may be configured to create a mapping between physical locations associated with interacting entities and interaction terminals at the physical locations associated with the interacting entities based on historical interaction records received from an interaction backend system. The one or more processors may be configured to receive, from a user device, a request associated with the automated information transfer, wherein the request indicates a location of the user device. The one or more processors may be configured to identify, based on the request and the location of the user device, one or more interacting entities that are associated with automated information transfer services within a threshold proximity of the location of the user device. The one or more processors may be configured to present, to the user device, a graphical user interface that enables selection, via a user input, of an interacting entity that is associated with the automated information transfer from an indication of the one or more interacting entities that are associated with the automated information transfer services. The one or more processors may be configured to identify, based on the mapping and the selection of the interacting entity associated with the automated information transfer, one or more interaction terminals at a physical location associated with the interacting entity. The one or more processors may be configured to provide, to the user device, one or more identifiers associated with the one or more interaction terminals. The one or more processors may be configured to receive, from the one or more interaction terminals, authorization information associated with the automated information transfer. The one or more processors may be configured to determine, based on the authorization information, whether the automated information transfer is authorized. The one or more processors may be configured to perform an action based on determining whether the automated information transfer is authorized.

Some implementations described herein relate to a method for using location-based mapping to enable automated information transfer at a user location. The method may include receiving, by an automated information transfer system and from a user device, an indication of a location of the user device. The method may include identifying, by the automated information transfer system and based on the location of the user device, an interacting entity associated with the automated information transfer that is associated with a physical location that is within a threshold proximity of the location of the user device. The method may include receiving, by the automated information transfer system and from the user device, item-specific data associated with the automated information transfer. The method may include identifying, by the automated information transfer system and based on the interacting entity, one or more interaction terminals at the physical location associated with the interacting entity. The method may include receiving, by the automated information transfer system and from the one or more interaction terminals, authorization information associated with the automated information transfer. The method may include performing an action based on whether the authorization information indicates that the automated information transfer is at least one of, authorized, conditionally authorized, not authorized, or conditionally not authorized.

Some implementations described herein relate to a non-transitory computer-readable medium that stores a set of instructions. The set of instructions, when executed by one or more processors of an automated information transfer system, may cause the automated information transfer system to receive, from a user device, an indication of a location of the user device. The set of instructions, when executed by one or more processors, may cause the automated information transfer system to identify, based on the location of the user device, one or more interacting entities that are associated with automated information transfer services within a threshold proximity of the location of the user device. The set of instructions, when executed by one or more processors, may cause the automated information transfer system to send, to the user device, an indication of the one or more interacting entities that are associated with the automated information transfer services. The set of instructions, when executed by one or more processors, may cause the automated information transfer system to receive, from the user device, a user input that indicates a selection of an interacting entity for an automated information transfer from the one or more interacting entities that are associated with the automated information transfer services. The set of instructions, when executed by one or more processors, may cause the automated information transfer system to identify, based on the selection of the interacting entity associated with the automated information transfer, one or more interaction terminals at a physical location associated with the interacting entity. The set of instructions, when executed by one or more processors, may cause the automated information transfer system to provide, to the user device, one or more identifiers associated with the one or more interaction terminals. The set of instructions, when executed by one or more processors, may cause the automated information transfer system to receive, from the one or more interaction terminals, authorization information associated with the automated information transfer. The set of instructions, when executed by one or more processors, may cause the automated information transfer system to determine, based on the authorization information, whether the automated information transfer is authorized. The set of instructions, when executed by one or more processors, may cause the automated information transfer system to perform an action based on determining whether the automated information transfer is authorized.

DETAILED DESCRIPTION

Figure 1A:
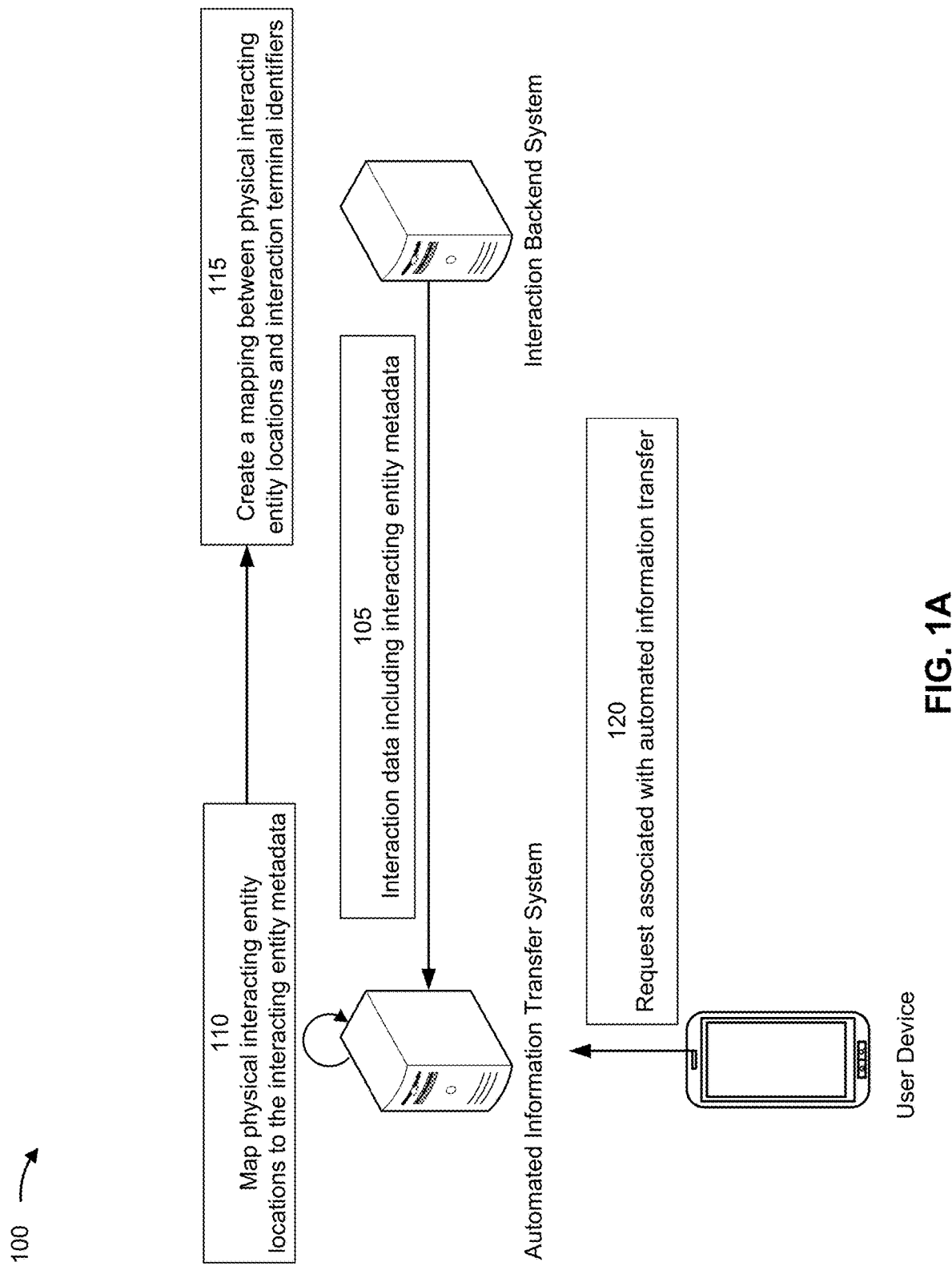
FIGS. 1A-1D are diagrams of an example associated with using a location-based mapping to enable an automatic information transfer at a user location, in accordance with some embodiments of the present disclosure.

The following detailed description of example implementations refers to the accompanying drawings. The same reference numbers in different drawings may identify the same or similar elements.

An automated checkout system, which is also known as a self-checkout system, may enable customers to scan, bag, and pay for their purchases (e.g., without a need for a cashier). However, in some cases, automated checkout systems may be associated with various drawbacks. For example, automated checkout systems may be negatively impacted by one or more technical difficulties (e.g., barcode scanning errors, payment processing errors, and/or software failures), which can lead to delays for customers. Additionally, automated checkout systems can be vulnerable to theft and/or fraud (e.g., because there is no cashier to verify that items have been scanned and/or paid for correctly). Furthermore, automated checkout systems can be confusing and/or frustrating for some customers (e.g., because the customers are not familiar with operating one or more components of the automated checkout system and/or because the customer have difficulty scanning items and/or entering payment information, which can lead to customer dissatisfaction and a negative customer experience.

Some implementations described herein relate to using location-based mapping to enable automated information transfer at a user location. For example, an automated information transfer system may use location-based mapping to identify an interaction terminal (e.g., a transaction terminal and/or a point-of-sale (POS) terminal, among other examples) that is associated with an interacting entity (e.g., a transacting entity and/or a merchant, among other examples) that is located within a threshold proximity of a location of a user device (e.g., that is located at the user location). As an example, the user device may be present at the user location to engage in an interaction with the interacting entity where information may be transferred between and/or among multiple devices and/or systems (e.g., the automated information transfer system, the user device, and/or the interaction terminal associated with the interacting entity, among other examples) to complete the interaction.

In some implementations, the automated information transfer system may determine the location of the user device and may identify interacting entities that enable automated information transfer in association with one or more interactions that may be performed at physical locations associated with the interacting entities that are located within a threshold proximity of the location of the user device. Based on identifying the interacting entities, the automated information transfer system may identify one or more interaction terminals associated with the interacting entities.

As an example, the automated information transfer system may determine one or more identifiers associated with the one or more interaction terminals at the physical location associated with the interacting entity. The automated information transfer system may provide an indication of the one or more interaction terminal identifiers to the user device, which enables the user device to identify an interaction terminal at the physical location associated with the interacting entity.

Based on identifying the interaction terminal, the user device may communicate with the interaction terminal (e.g., as a step to be performed in association with the interaction). As an example, the user device may obtain information associated with the interaction, such as item-specific data associated with one or more items that are present at the physical location associated with the interacting entity. The user device may send the item-specific data to the interaction terminal. The interaction terminal may process the item-specific data.

In some implementations, the automated information transfer system may generate authorization information based on processing the item-specific data. The interaction terminal may send the authorization information to the automated information transfer system and/or to the user device. The automated information transfer system and/or the user device may process the authorization information. The automated information transfer system and/or the user device may perform one or more actions based on processing the authorization.

In some implementations, the authorization information may include information that enables an authorization decision and/or an approval decision associated with the interaction to be made (e.g., by an application executing on the user device and/or by the automated information transfer system). For example, the automated information transfer system and/or the user device may analyze the authorization information to determine whether the automated information transfer is authorized and/or that the automated information transfer is approved. The automated information transfer system and/or the user device may send one or more communications that indicate whether the automated information transfer is authorized and/or approved.

In this way, the automated information transfer system may use location-based mapping to enable automated information transfer at a user location, which enables users to perform fewer steps associated with engaging in interactions with interacting entities at the physical locations associated with the interacting entity (e.g., because the user has to perform fewer steps to transfer the information to complete the interaction). Additionally, reducing the number of steps can conserve resources, such as network resources because there are fewer back-and-forth messages associated with the interaction and/or processing resources because the devices associated with the interaction perform fewer operations. Furthermore, using the location-based mapping enhances security, by verifying that the user is present or near the interaction terminal, which may help to reduce theft or fraud.

FIGS. 1A-1D are diagrams of an example 100 associated with using a location-based mapping to enable an automatic information transfer at a user location. As shown in FIGS.

1A-1D, example 100 includes an automated information transfer system, a user device, an interaction terminal, and an interaction backend system. These devices are described in more detail in connection with FIGS. 2 and 3.

As shown in FIG. 1A, and by reference number 105, the automated information transfer system may receive historical interaction data (e.g., raw transaction data) from the interaction backend system. For example, the historical interaction data may include historical interaction records (e.g., historical transaction records) associated with various interactions (e.g., transactions) processed via the interaction backend system. The historical interaction records may include interacting entity metadata (e.g., transacting entity metadata) associated with various interacting entity attributes (e.g., transacting entity attributes).

As an example, the interacting entity data may include information associated with a name, city, state, zip code, country, and/or category code (e.g., a merchant category code (MCC) associated with an interacting entity in addition to interaction metadata (e.g., an identifier of an interaction terminal being used to perform an interaction). Accordingly, the automated information transfer system may map the interacting entity metadata to physical interacting entity locations, and may reference the interaction terminal identifiers included in the historical interaction records to create the mapping between physical locations associated with interacting entities and identifiers of one or more interaction terminals that are present at each physical location associated with the interacting entity, as described in more detail elsewhere herein.

In some implementations, the interaction backend system and the automated information transfer system may be associated with a financial institution (e.g., a bank, a lender, a credit card company, and/or a credit union, among other examples) and/or an interaction card association that authorizes interactions and/or that facilitates transfers of funds (e.g., a card association). As an example, each historical interaction record that the automated information transfer system receives from the interaction backend system may be associated with various fields, which may include information related to a user, an interacting entity, and/or the interaction between the user and the interacting entity.

For example, the various fields related to the user may include a user identifier, a cardholder name, a cardholder account number, and/or a card expiration date, among other examples. As an example, the fields related to the interacting entity may include a name, an address, a city, a state, a zip code, a country, and/or category code information (e.g., an MCC), a category code group, a category code number, and/or a category code description, among other examples) associated with the interacting entity. The category code information associated with the interacting entity may categorize the interacting entity into an interacting segment (e.g., a market segment).

For example, the interacting segment may be associated with transportation services, retail outlet services, business services, and/or government services, among other examples. As another example, the fields related to the interaction may include an initial authorized amount, a final amount (e.g., accounting for a tip added to the authorized amount and/or other post-authorization processing), a date and/or a time associated with the interaction, a POS entry mode, a POS terminal identifier, and/or an approval code, among other examples.

As further shown in FIG. 1A, and by reference number 110, the automated information transfer system may map physical interacting entity locations to the interacting entity metadata (e.g., that is included in the historical interaction records). In some implementations, the automated information transfer system may determine, or otherwise obtain, a set of interacting entity keys based on the historical interaction records received from the interaction backend system. For example, an interacting entity key may generally include a combination of fields that is sufficient to uniquely identify an interacting entity. As an example, the interacting entity key may include a combination of a name, a city, a state, a zip code, a country, and/or a category code (e.g., an MCC) that is unique to a particular interacting entity.

Accordingly, because interacting entity information typically does not change (or changes infrequently), the information in the interacting entity key may be common to all historical interaction records that share the same combination of fields. Furthermore, the interacting entity key may be used to distinguish different business locations for the same interacting entity (e.g., different retail locations and/or regional offices) and/or different businesses that an interacting entity may operate at a single location (e.g., at a superstore that includes a grocery store associated with a first MCC and a pharmacy associated with a second MCC).

Thus, for example, the set of interacting entity keys determined, or obtained, by the automated information transfer system may provide an index to enhancement data (e.g., information associated with the interacting entity that is expressed using a standard format and/or additional information that provides more granular information about the interacting entity that may not be included in the historical interaction records). As an example, each interacting entity key may be mapped to a closest match in a database that includes more granular interacting entity data to indicate the physical location of the corresponding interacting entity, such as a full street address and/or geographic coordinates (e.g., a latitude and longitude and/or other suitable information identifying a specific geographical point and/or area corresponding to a building, a structure, and/or other place where the interacting entity conducts interactions).

As further shown in FIG. 1A, and by reference number 115, the automated information transfer system may create a mapping between physical interacting entity locations and interaction terminal identifiers at the physical interacting entity locations. For example, the historical interaction records that are received from the interaction backend system may include, in addition to information identifying a user and/or an interacting entity associated with each respective interaction, information associated with the interaction, such as an amount of the interaction, a date and time of the interaction, and/or an identifier of an interaction terminal (e.g., a POS terminal) that was used to request authorization for the interaction.

Accordingly, in some implementations, the automated information transfer system may use the interacting entity metadata included in the historical interaction records to identify one or more physical locations that are operated by a particular interacting entity (e.g., street addresses and/or geographic coordinates associated with one or more brick-and-mortar stores), and the automated information transfer system may map each physical interacting entity location to one or more interaction terminal identifiers based on the interaction terminal identifiers included in the historical interaction records. In this way, the automated information transfer system may have access to a mapping that indicates one or more physical locations that are operated by a particular interacting entity and/or identifiers of one or more interaction terminals that are present at each of the one or more physical locations.

As further shown in FIG. 1A, and by reference number 120, the automated information transfer system may receive, and the user device may send, a request associated with automated information transfer (e.g., at the user location of the user). In some implementations, the request associated with the automated information transfer may include an indication of a location of the user device. As an example, the indication of the location of the user device may include geographic coordinates, such as geographic coordinates obtained via a positioning system (e.g., a global positioning system (GPS)) of the user device. For example, the geographic coordinates obtained by the positioning system of the user device may include a latitude and longitude and/or other suitable information identifying a specific geographical point and/or area corresponding to the location of the user device.

Although the indication of the location of the user device has been described as being provided via the request associated with the automated information transfer as described in connection with FIG. 1A and reference number 120, the user device may provide the indication of the location of the user device to the automated information transfer system separately from the request for the automated information transfer and/or in any other suitable manner. As an example, the user device many share its location with the automated information transfer system.

In some implementations, the automated information transfer system may be associated with a financial institution (e.g., a bank and/or an interaction card association), and a user of the user device may hold one or more accounts that are managed through the financial institution (e.g., the user may be a holder of the one or more accounts or a person who is authorized to enter into interactions using the one or more accounts). As an example, the one or more accounts may include a credit card account, a checking account, a savings account, an investment account, and/or another suitable account type.

In some implementations, the one or more accounts may each be associated with a primary account number (PAN) and/or a primary payment credential that can be used to enter into interactions using the associated account. As an example, if the PAN and/or the primary payment credential is associated with a credit card, then amounts associated with interactions that are performed using the credit card may be added to a balance of the PAN or primary payment credential. As another example, if the PAN and/or the primary payment credential is associated with a debit card, then amounts associated with interactions that are performed using the debit card may be deducted from a balance of the PAN or primary payment credential (e.g., from a balance in a checking or savings account).

In some implementations, the one or more accounts may each be associated with a VCN, which is sometimes referred to as a virtual credential, a virtual payment credential, and/or a virtual credit card. A VCN is a computer-generated version of a primary payment credential (e.g., a credit card number) that may be linked to the primary payment credential and used as a substitute for the primary payment credential in a transaction. For example, a financial institution may issue a transaction card (e.g., a credit card) to a person, company, or organization, and a transaction management system of the financial institution may also issue one or more virtual card numbers that can be used with different merchant transaction systems. For example, a first virtual credential may be usable with a first merchant only, a second virtual credential may be usable with a second merchant only, and so on.

Figure 1B:
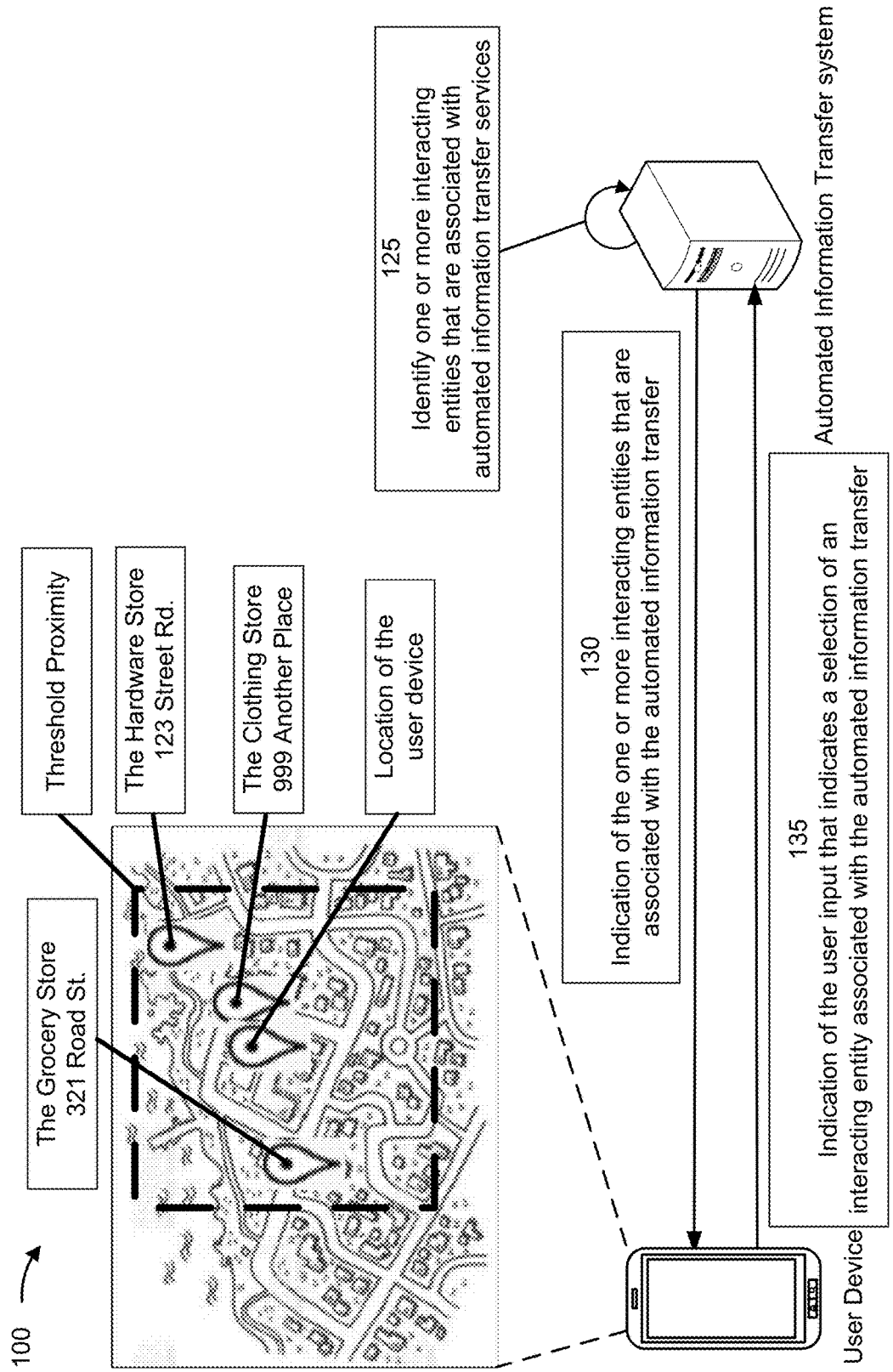

As further shown in FIG. 1B, and by reference number 125, the automated information transfer system may identify one or more interacting entities that are associated with automated information transfer services near the location of the user device. In some implementations, the automated information transfer system may compare the physical location of an interacting entity that offers automated information transfer services and the location of the user device to determine distance between the physical location of the interacting entity and the location of the user device. As an example, the automated information transfer system may determine that the physical location of the interacting entity is within the threshold proximity of the location of the user device based on determining that the distance between the physical location of the interacting entity and the location of the user device satisfies (e.g., is less than or equal to) the threshold proximity.

As an example, if the interaction is associated with a purchase of an item at a physical location (e.g., by a user using the user device) associated with an interacting entity that is located within the threshold proximity of the location of the user device, then an interacting entity that enables automated transfer of information associated with the purchase of the item (e.g., the interacting entity uses an interacting device and/or system, such as a payment terminal, to automatically receive and/or provide information associated with the purchase of the item) is an interacting entity associated with automated information transfer. In some implementations, the automated transfer of the information associated with the purchase of the item may enable the automated information transfer system to perform one or more actions, such as approving a payment associated with the purchase of the item based on determining that the purchase of the item is an authorized purchase (e.g., that is performed by the user), as described in more detail elsewhere herein.

As further shown in FIG. 1B, and by reference number 130, the automated information transfer system may provide, and the user device may receive, an indication of the one or more interacting entities that are associated with the automated information transfer services. In some implementations, the automated information transfer system may present, to the user device, a graphical user interface (GUI) that enables selection, via a user input, of an interacting entity that is associated with the automated information transfer services from the one or more interacting entities that are associated with the automated information transfer services.

In some implementations, the GUI may include a map that indicates the one or more interacting entities that are associated with the automated information transfer services (e.g., the one or more interacting entities that enable automated information transfer in association with an interaction that is performed at a physical location of the interacting entity that is located within a threshold proximity of the location of the user device). As shown in FIG. 1B, the map of the GUI indicates a first interacting entity associated with automated information transfer services (e.g., shown as "The Hardware Store" in FIG. 1), a second interacting entity associated with automated information transfer services (e.g., shown as "The Grocery Store" in FIG. 1), and a third interacting entity associated with automated information transfer (e.g., shown as "The Clothing Store" in FIG. 1).

In some implementations, the map provided by the GUI may indicate one or more physical locations of the one or more interacting entities that are within the threshold proximity (e.g., a threshold distance) of the location of the user device (e.g., based on the indication of the location of the user device and/or based on the user device sharing its location with the automated information transfer system, among other examples). For example, with reference to FIG. 1B, the map of the GUI indicates a first physical location associated with the first interacting entity, a second physical location associated with the second interacting entity, and a third physical location associated with the third interacting entity that are each located within the threshold proximity (e.g., shown as a dashed box in the map of FIG. 1B) of the location of the user device.

In some implementations, the user may provide the user input via selecting an input option associated with an interacting entity associated with automated information transfer services indicated by the GUI on the map. As an example, the user may provide a user input that indicates that the user selects the third interacting entity identified as "The Clothing Store" by interacting with the input option associated with the interacting entity identified as "The Clothing Store." As an example, the user may select the third interactive entity because the user is performing an interaction at the physical location of the third interacting entity. Although the GUI is shown as a map, other possible GUI designs are possible (e.g., the user could be presented with a list of merchant names and/or addresses).

As further shown in FIG. 1B, and by reference number 135, the user device may provide, and the automated information transfer system may receive, an indication of the user input that indicates the selection of the interacting entity associated with the automated information transfer. For example, the user device may provide the indication of the user input to the automated information transfer system in response to detecting that the user input has been provided by the user (e.g., via the user device).

Figure 1C:
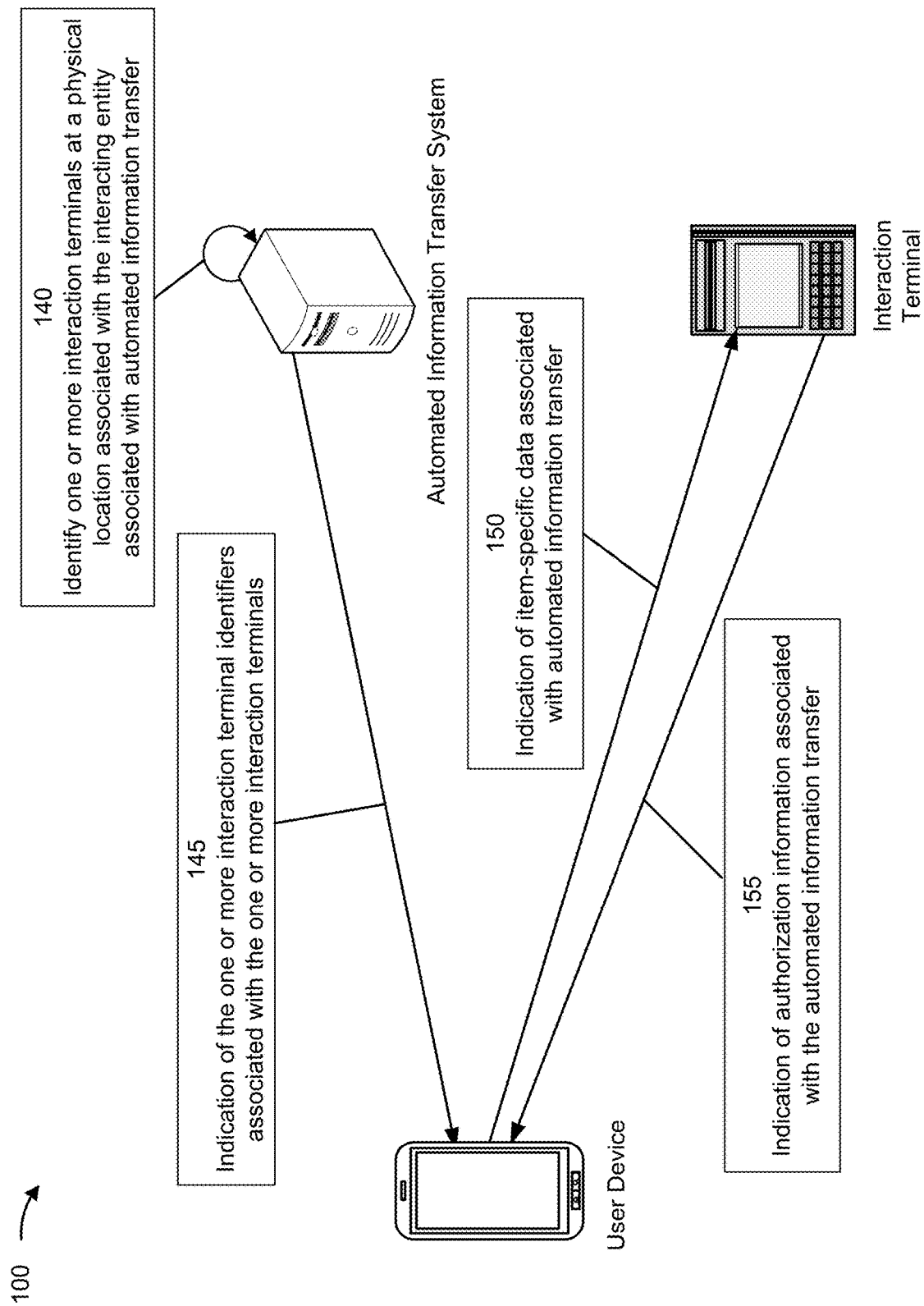

As shown in FIG. 1C, and by reference number 140, the automated information transfer system may identify one or more interaction terminals at the physical location of the interacting entity associated with automated information transfer. For example, the automated information transfer system may identify the one or more interaction terminals at the physical location of the interacting entity associated with the automated information transfer services based on the mapping, as described in more detail elsewhere herein (e.g., in connection with FIG. 1A). As another example, the automated information transfer system may provide an indication of the one or more interaction terminal identifiers to the user device, which enables the user device to identify an interaction terminal at the physical location associated with the interacting entity.

As an example, the automated information transfer system use the interacting entity metadata included in the historical interaction records to identify one or more physical locations that are operated by a particular interacting entity (e.g., street addresses and/or geographic coordinates associated with one or more brick-and-mortar stores), and the automated information transfer system may map each physical location associated with the interacting entity to one or more interaction terminals based on the interaction terminal identifiers included in the historical interaction records. In this way, the automated information transfer system may identify one or more interaction terminal identifiers associated with one or more interaction terminals at a physical location associated with the interacting entity associated with automated information transfer.

As further shown in FIG. 1C, and by reference number 145, the automated information transfer system may provide, and the user device may receive, an indication of the one or more interaction terminal identifiers associated with the one or more interaction terminals. For example, the automated information transfer system may provide the indication of the one or more interaction terminal identifiers to the user device to enable the user device to communicate with an interaction terminal associated with the interacting entity associated with automated information transfer.

As further shown in FIG. 1C, and by reference number 150, the user device may provide, and the interaction terminal may receive, an indication of item-specific data associated with the automated information transfer. In some implementations, the item-specific data may include information associated with one or more items that the user intends to purchase when the user is present at the physical location of the interacting entity selected by the user.

For example, the user may use a camera of the user device to capture images associated with the one or more items and/or information associated with the one or more items. As an example, the user may use a camera of the user device to capture an image of price tags associated with the one or more items and/or may scan stock keeping units (SKUs) and/or barcodes associated with the one or more items.

As another example, the user may use a camera of the user device to scan the one or more items, and the user device may use computer vision techniques and/or machine learning techniques to identify the one or more items. Additionally, or alternatively, the user device may transmit, one or more images and/or image data (e.g., captured by the user device) associated with the one or more items to the automated information transfer system. The automated system may process the one or more images and/or the image data (e.g., using the computer vision techniques and/or the machine learning techniques to identify the one or more items. The user device may provide the item-specific data to an interaction terminal that is associated with the interacting entity selected by the user, as described in more detail elsewhere herein. As an example, the interaction terminal that receives the item-specific data is identified by the user device based on the terminal identifiers provided to the user device (e.g., by the interaction backend system.

As further shown in FIG. 1C, and by reference number 155, the interaction terminal may provide, and the user device may receive, an indication of authorization information associated with the automated information transfer. In some implementations, the interaction terminal may process the item-specific data to determine information associated with payment for the one or more items, which may be included in the authorization information. For example, the authorization information may include information may include payment information associated with purchasing the one or more items. As an example, the authorization information may include acquiring bank information, payment information (e.g., a balance or amount due), and/or any other information that may be used to determine whether to authorize an interaction and/or approve a payment associated with the interaction. In some implementations, the authorization information may indicate that the automated information transfer is authorized based on verifying value information associated with the one or more items indicated by the item-specific data.

Figure 1D:
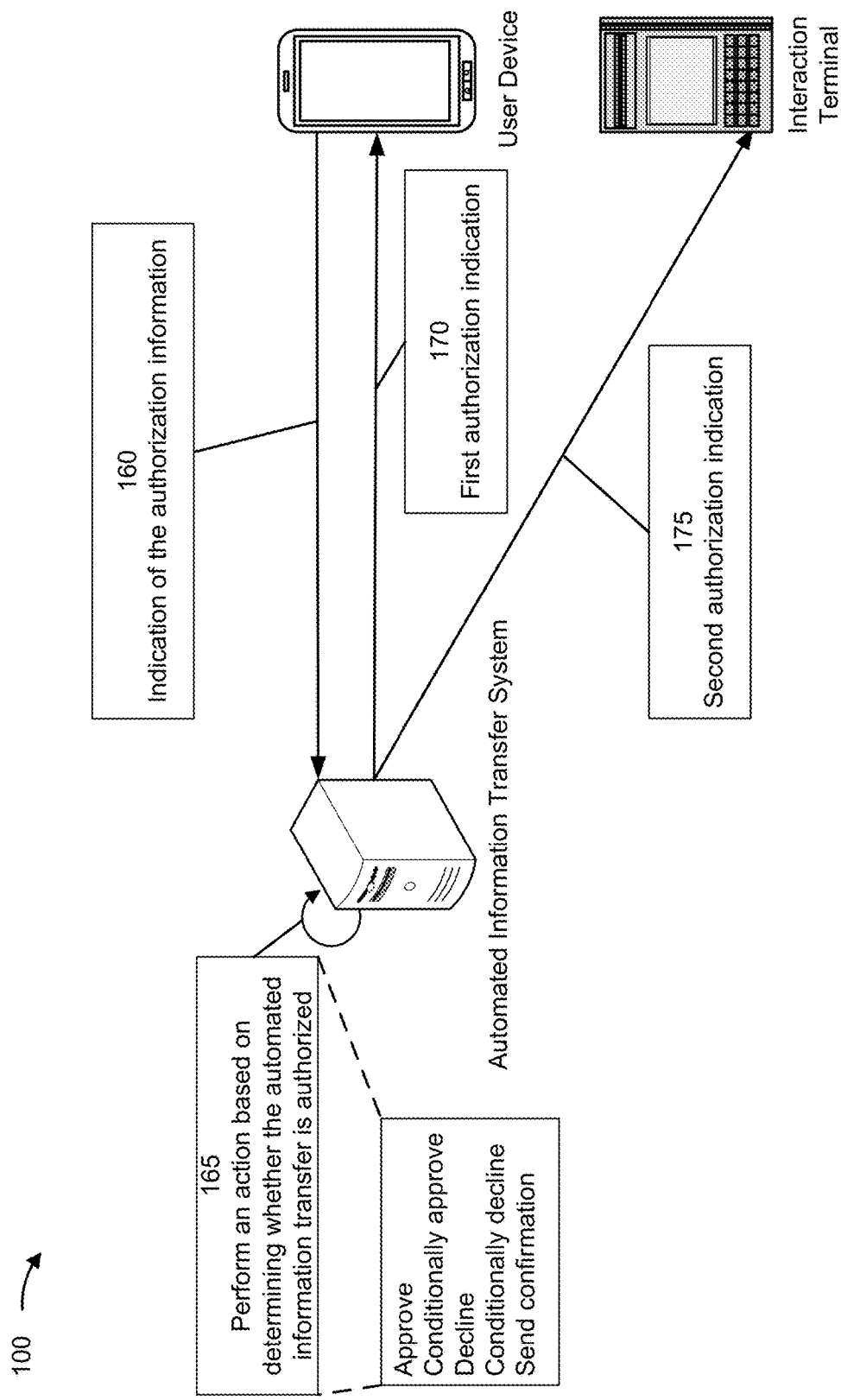

As shown in FIG. 1D, and by reference number 160, the user device may provide, and the automated information transfer system may receive, an indication of the authorization information. For example, the user device may provide the indication of the authorization information in response to receiving the indication of the authorization information from the interaction terminal. As an example, the authorization information may include an amount, payee information, a payment method, an authorization code, cardholder verification, a billing address, a shipping address, an invoice number, a date of interaction, a purpose of payment, bank account information, acquiring bank information, and/or a currency type, among other examples.

As further shown in FIG. 1D, and by reference number 165, the automated information transfer system may perform an action based on determining whether the automated information transfer is authorized. For example, the automated information transfer system may provide, to the user device and to the interaction terminal (e.g., that provided the authorization information), an approval indication based on determining that the automated information transfer is at least one of authorized or conditionally authorized. As an example, the approval indication may indicate that the automated information transfer is at least one of approved or conditionally approved.

For example, the approval indication may indicate that the automated information transfer is approved based on the automated information transfer system determining that an amount (e.g., associated with the automated information transfer) satisfies (e.g., is less than or equal to) a threshold and the account (e.g., associated with the user) has a sufficient balance to cover the amount. As another example, the approval indication may indicate that the automated information transfer is conditionally approved based on the automated information transfer system determining that an amount (e.g., associated with the automated information transfer) does not satisfy (e.g., is greater than or equal to) a threshold, but the user may be given a time period within which to increase a balance of the account.

As another example, the automated information transfer system may provide, to the user device and to the interaction terminal, a not approved (e.g., declined) indication based on determining that the automated information transfer is at least one of not authorized or conditionally not authorized. For example, the not approved indication may indicate that the automated information transfer is at least one of not approved or conditionally not approved.

For example, the not approved indication may indicate that the automated information transfer is not approved based on the automated information transfer system determining that an amount (e.g., associated with the automated information transfer) does not satisfy (e.g., is greater than or equal to) a threshold because the account (e.g., associated with the user) has an insufficient balance to cover the amount. As another example, the conditionally not approved indication may indicate that the automated information transfer is conditionally not approved based on the automated information transfer system determining that a distance between the physical location of the interaction terminal and the location of the user device satisfies (e.g., is greater than or equal to) a threshold (e.g., because the user is holding the user device at a large distance from the interaction terminal).

In some implementations, the automated information transfer system may approve the automated information transfer based on determining that the automated information transfer is authorized. As an example, the automated information transfer system may provide, to a server device and based on approving the automated information transfer, an indication of a confirmation associated with the automated information transfer. For example, the indication of the confirmation may include a payment associated with the purchase of the one or more items.

As further shown in FIG. 1D, and by reference number 170, the automated information transfer system may provide, and the user device may receive, a first authorization indication. For example, the first authorization indication may include information that indicates whether the automated information transfer is approved or not approved (e.g., that the one or more items have been purchased or have not been purchased).

As further shown in FIG. 1D, and by reference number 175, the automated information transfer system may provide, and the interaction terminal may receive, a second authorization indication. For example, the second authorization indication may include information that confirms that the automated information transfer is approved or not approved (e.g., that confirms whether payment for the one or more items has been transferred to the acquiring bank associated with the interaction terminal).

In some implementations, to determine whether the automated information transfer is authorized, the automated information transfer system may verify value information, indicated by the authorization information, associated with one or more items that are associated with the automated information transfer. As another example, to determine whether the automated information transfer is authorized, the automated information transfer system may verify that the location of the user device is located within a threshold distance of the interaction terminal used in the interaction. In some implementations, the automated information transfer system may provide, to the user device and to the one or more interaction terminals, a request for additional information based on determining that the automated information transfer is at least one of conditionally authorized or conditionally not authorized. As an example, the request for additional information may indicate a request to verify a billing address, a request to verify a shipping address, and/or a request to verify an amount, among other examples.

In this way, the automated information transfer system may use location-based mapping to enable automated information transfer at a user location, which enables users to perform fewer steps associated with engaging in interactions with interacting entities at the physical locations associated with the interacting entity (e.g., because the user has to perform fewer steps to transfer the information to complete the interaction). Additionally, reducing the number of steps can conserve resources, such as network resources because there are fewer back-and-forth messages associated with the interaction and/or processing resources because the devices associated with the interaction perform fewer operations. Furthermore, using the location-based mapping enhances security, by verifying that the user is present or near the interaction terminal, which may help to reduce theft or fraud.

As indicated above, FIGS. 1A-1D are provided as an example. Other examples may differ from what is described with regard to FIGS. 1A-1D.

Figure 2:
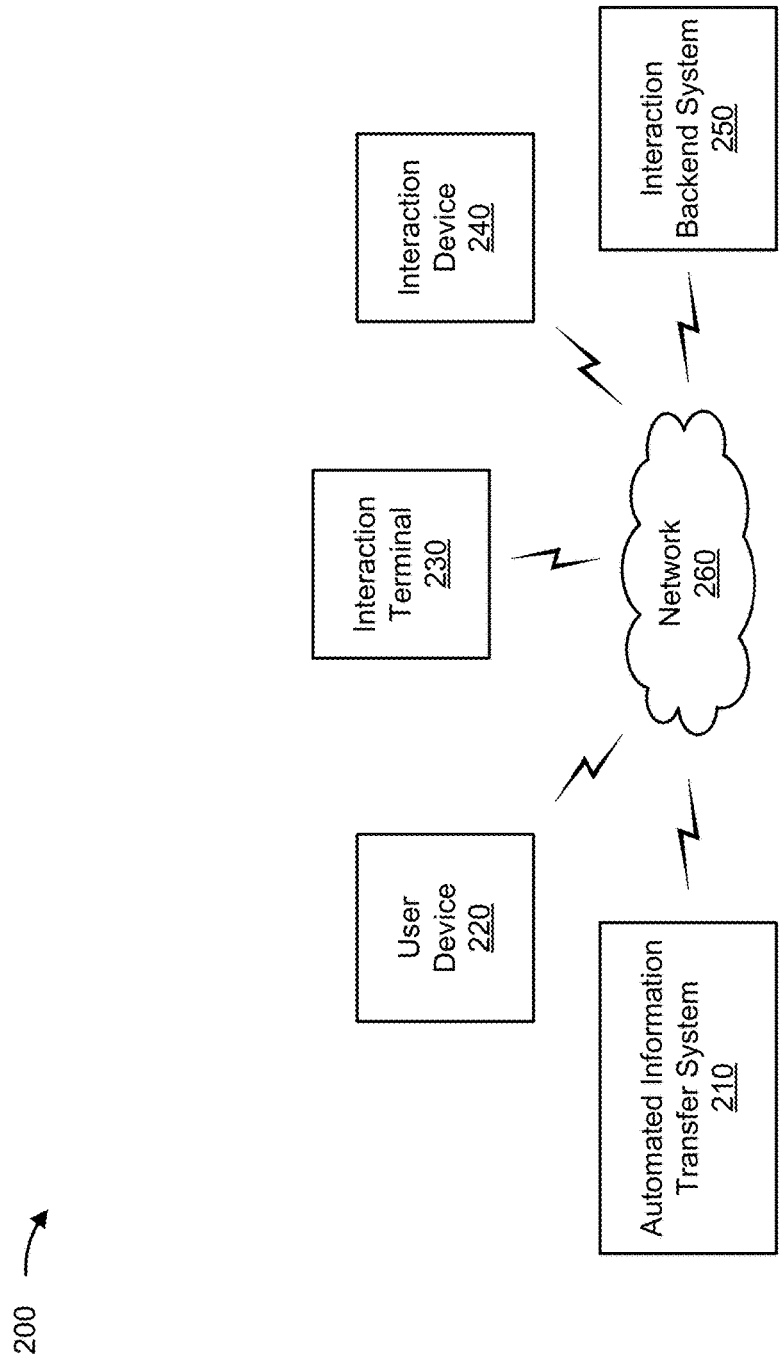
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an automated information transfer system 210, a user device 220, an interaction terminal 230, an interaction device 240, an interaction backend system 250, and/or a network 260. Devices of environment 200 may interconnect via wired connections, wireless connections, or a combination of wired and wireless connections.

The automated information transfer system 210 may include one or more devices capable of receiving, generating, storing, processing, providing, and/or routing information associated with using a location-based mapping to enable an automated information transfer at a user location, as described elsewhere herein. The automated information transfer system 210 may include a communication device and/or a computing device. For example, the automated information transfer system 210 may include a server, such as an application server, a client server, a web server, a database server, a host server, a proxy server, a virtual server (e.g., executing on computing hardware), or a server in a cloud computing system. In some implementations, the automated information transfer system 210 may include computing hardware used in a cloud computing environment.

The user device 220 may include one or more devices capable of receiving, generating, storing, processing, and/or providing information associated with using a location-based mapping to enable an automated information transfer at a user location, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The interaction terminal 230 may include one or more devices capable of facilitating an electronic transaction associated with the interaction device 240. For example, the interaction terminal 230 may include a POS terminal, a payment terminal (e.g., a credit card terminal, a contactless payment terminal, a mobile credit card reader, or a chip reader), and/or an automated teller machine (ATM). The interaction terminal 230 may include one or more input components and/or one or more output components to facilitate obtaining data (e.g., account information) from the interaction device 240 and/or to facilitate interaction with and/or authorization from an owner or accountholder of the interaction device 240. Example input components of the interaction terminal 230 include a number keypad, a touchscreen, a magnetic stripe reader, a chip reader, and/or a radio frequency (RF) signal reader (e.g., a near-field communication (NFC) reader). Example output devices of interaction terminal 230 include a display and/or a speaker.

The interaction device 240 may include one or more devices capable of being used for an electronic transaction. In some implementations, the interaction device 240 may include a transaction card (or another physical medium with integrated circuitry) capable of storing and communicating account information, such as a credit card, a debit card, a gift card, an ATM card, a transit card, a fare card, and/or an access card. In some implementations, the interaction device 240 may be the user device 220 or may be integrated into the user device 220. For example, the user device 220 may execute an electronic payment application capable of performing functions of the interaction device 240 described herein. Thus, one or more operations described herein as being performed by the interaction device 240 may be performed by a transaction card, the user device 220, or a combination thereof.

The interaction device 240 may store account information associated with the interaction device 240, which may be used in connection with an electronic transaction facilitated by the interaction terminal 230. The account information may include, for example, an account identifier that identifies an account (e.g., a bank account or a credit account) associated with the interaction device 240 (e.g., an account number, a card number, a bank routing number, and/or a bank identifier), a cardholder identifier (e.g., identifying a name of a person, business, or entity associated with the account or the interaction device 240), expiration information (e.g., identifying an expiration month and/or an expiration year associated with the interaction device 240), and/or a credential (e.g., a payment token). In some implementations, the interaction device 240 may store the account information in tamper-resistant memory of the interaction device 240, such as in a secure element. As part of performing an electronic transaction, the interaction device 240 may transmit the account information to the interaction terminal 230 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the interaction device 240 and the interaction terminal 230 may communicate with one another by coming into contact with one another (e.g., using a magnetic stripe or an EMV chip) or via contactless communication (e.g., using NFC).

The interaction backend system 250 may include one or more devices capable of processing, authorizing, and/or facilitating a transaction. For example, the interaction backend system 250 may include one or more servers and/or computing hardware (e.g., in a cloud computing environment or separate from a cloud computing environment) configured to receive and/or store information associated with processing an electronic transaction. The interaction backend system 250 may process a transaction, such as to approve (e.g., permit, authorize, or the like), conditionally approve (e.g., permit if conditions are met, authorize if conditions are met, or the like), decline (e.g., reject, deny, or the like), or conditionally decline (e.g., decline but approve if conditions are met or the like) the transaction and/or to complete the transaction if the transaction is approved. The interaction backend system 250 may process the transaction based on information received from the interaction terminal 230, such as transaction data (e.g., information that identifies a transaction amount, a merchant, a time of a transaction, a location of the transaction, or the like), account information communicated to the interaction terminal 230 by the interaction device 240, and/or information stored by the interaction backend system 250 (e.g., for fraud detection).

The interaction backend system 250 may be associated with a financial institution (e.g., a bank, a lender, a credit card company, or a credit union) and/or may be associated with a transaction card association that authorizes a transaction and/or facilitates a transfer of funds. For example, the interaction backend system 250 may be associated with an issuing bank associated with the interaction device 240, an acquiring bank (or merchant bank) associated with the merchant and/or the interaction terminal 230, and/or a transaction card association (e.g., VISA® or MASTERCARD®) associated with the interaction device 240. Based on receiving information associated with the interaction device 240 from the interaction terminal 230, one or more devices of the interaction backend system 250 may communicate to authorize a transaction and/or to transfer funds from an account associated with the interaction device 240 to an account of an entity (e.g., a merchant) associated with the interaction terminal 230.

The network 260 may include one or more wired and/or wireless networks. For example, the network 260 may include a cellular network, a public land mobile network, a local area network, a wide area network, a metropolitan area network, a telephone network, a private network, the Internet, and/or a combination of these or other types of networks. The network 260 enables communication among the devices of environment 200. In some implementations, the interaction terminal 230 may communicate with the interaction device 240 using a first network (e.g., a contactless network or by coming into contact with the interaction device 240) and may communicate with the interaction backend system 250 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
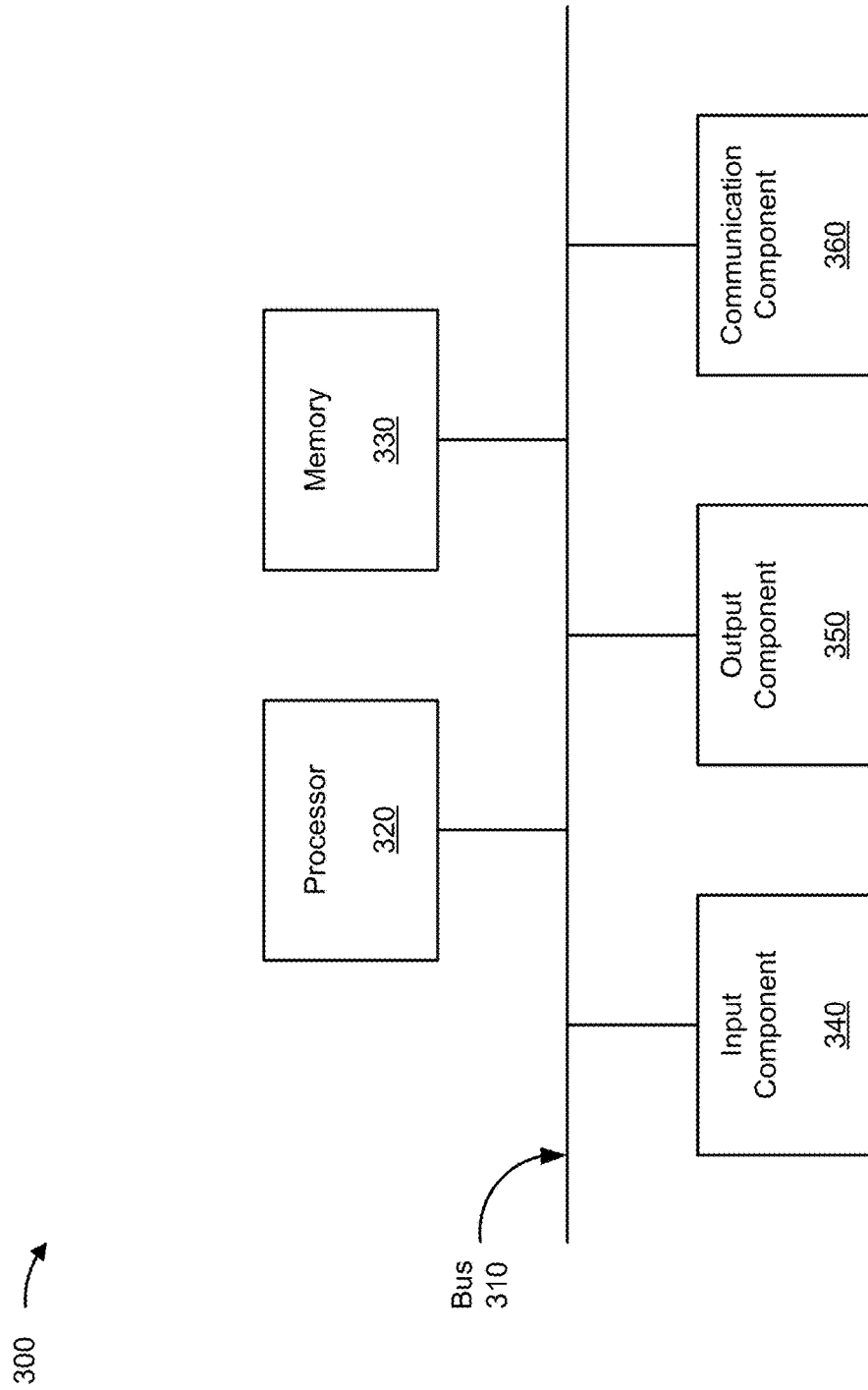
FIG. 3 is a diagram of example components of a device associated with a using location-based mapping to enable an automated information transfer at a user location, in accordance with some embodiments of the present disclosure.

FIG. 3 is a diagram of example components of a device 300 associated with using a location-based mapping to enable an automated information transfer at a user location. The device 300 may correspond to the automated information transfer system 210, the user device 220, the interaction terminal 230, the interaction device 240, and/or the interaction backend system 250. In some implementations, the automated information transfer system 210, the user device 220, the interaction terminal 230, the interaction device 240, and/or the interaction backend system 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
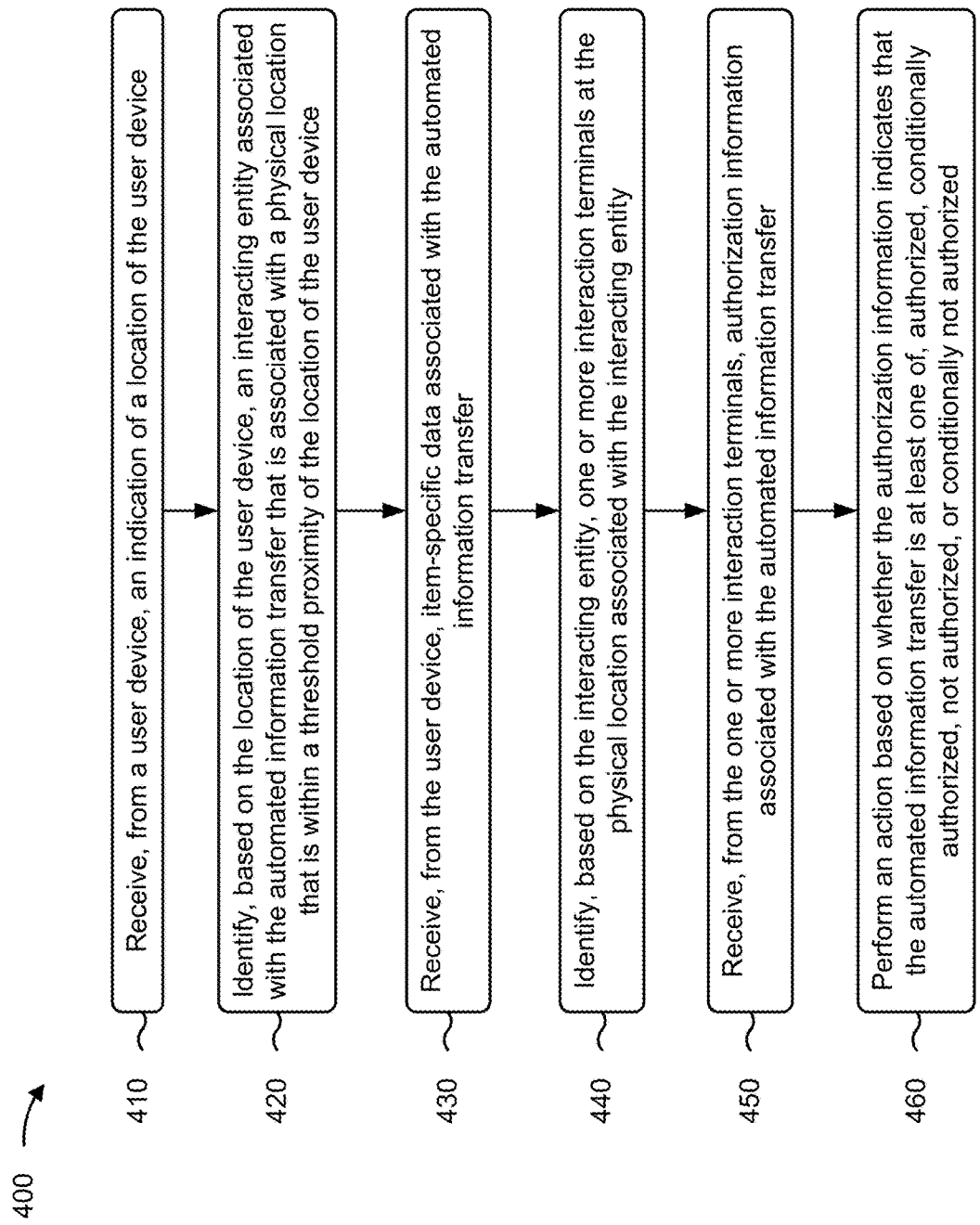
FIG. 4 is a flowchart of an example process associated with using a location-based mapping to enable an automated information transfer at a user location, in accordance with some embodiments of the present disclosure.

FIG. 4 is a flowchart of an example process 400 associated with using a location-based mapping to enable an automated information transfer at a user location. In some implementations, one or more process blocks of FIG. 4 may be performed by the automated information transfer system 210. In some implementations, one or more process blocks of FIG. 4 may be performed by another device or a group of devices separate from or including the automated information transfer system 210, such as the user device 220, the interaction terminal 230, the interaction device 240, and/or the interaction backend system 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a user device, an indication of a location of the user device (block 410). For example, the automated information transfer system 210 (e.g., using processor 320, memory 330, input component 340, and/or communication component 360) may receive, from a user device, an indication of a location of the user device, as described above in connection with reference number 120 of FIG. 1A. As an example, the user device may transmit a request associated with automated information transfer that includes an indication of the location of the user device.

As further shown in FIG. 4, process 400 may include identifying, based on the location of the user device, an interacting entity associated with the automated information transfer that is associated with a physical location that is within a threshold proximity of the location of the user device (block 420). For example, the automated information transfer system 210 (e.g., using processor 320 and/or memory 330) may identify, based on the location of the user device, an interacting entity associated with the automated information transfer that is associated with a physical location that is within a threshold proximity of the location of the user device, as described above in connection with reference number 125 of FIG. 1B. As an example, the automated information transfer system may compare the physical location of the interacting entity to the location of the user device to determine a distance between the location of the physical location of the interacting entity and the location of the user device.

As further shown in FIG. 4, process 400 may include receiving, from the user device, item-specific data associated with the automated information transfer (block 430). For example, the automated information transfer (e.g., using processor 320, memory 330, input component 340, and/or communication component 360) may receive, from the user device, item-specific data associated with the automated information transfer, as described above in connection with reference number 150 of FIG. 1C. As an example, the user device may obtain item-specific data associated with one or more items that a user intends to purchase when the user is at the physical location associated with the interacting entity selected by the user. The user device may provide the item-specific data to an interaction terminal that is associated with the interacting entity selected by the user, as described in more detail elsewhere herein.

As further shown in FIG. 4, process 400 may include identifying, based on the interacting entity, one or more interaction terminals at the physical location associated with the interacting entity (block 440). For example, the automated information transfer (e.g., using processor 320 and/or memory 330) may identify, based on the interacting entity, one or more interaction terminals at the physical location associated with the interacting entity, as described above in connection with reference number 140 of FIG. 1C. As an example, the automated information transfer system may provide an indication of the one or more interaction terminal identifiers to the user device, which enables the user device to identify an interaction terminal at the physical location associated with the interacting entity.

As further shown in FIG. 4, process 400 may include receiving, from the one or more interaction terminals, authorization information associated with the automated information transfer (block 450). For example, the automated information transfer (e.g., using processor 320, memory 330, input component 340, and/or communication component 360) may receive, from the one or more interaction terminals, authorization information associated with the automated information transfer, as described above in connection with reference number 155 of FIG. 1C. As an example, the authorization information may include acquiring bank information, payment information, and/or any other information that may be used to determine whether to authorize an interaction and/or approve a payment associated with the interaction.

As further shown in FIG. 4, process 400 may include performing an action based on whether the authorization information indicates that the automated information transfer is at least one of: authorized, conditionally authorized, not authorized, or conditionally not authorized (block 460). For example, the automated information transfer (e.g., using processor 320 and/or memory 330) may perform an action based on whether the authorization information indicates that the automated information transfer is at least one of: authorized, conditionally authorized, not authorized, or conditionally not authorized, as described above in connection with reference number 165 of FIG. 1D. As an example, the automated information transfer system may provide, to the user device and/or to the interaction terminal (e.g., that provided the authorization information), an approval indication based on determining that the automated information transfer is at least one of authorized or conditionally authorized. As an example, the approval indication may indicate that the automated information transfer is at least one of approved or conditionally approved.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for using location-based mapping to enable automated information transfer at a user location, the system comprising:
   one or more memories; and
   one or more processors, communicatively coupled to the one or more memories, configured to:
      receive, from a user device, a request associated with the automated information transfer,
         wherein the request indicates a location of the user device;
      identify, based on the request and the location of the user device, one or more interacting entities that are associated with automated information transfer services within a threshold proximity of the location of the user device;
      present, to the user device, a graphical user interface that enables selection, via a user input, of an interacting entity that is associated with the automated information transfer;
      receive historical transaction records including one or more interaction terminal identifiers;
      create, using the one or more interaction terminal identifiers, a mapping between physical locations associated with interacting entities and identifiers of interaction terminals that are present at each physical location of the physical locations;
      identify, based on the selection of the interacting entity associated with the automated information transfer and based on the mapping, one or more interaction terminals at a physical location associated with the interacting entity;
      provide, to the user device, one or more identifiers associated with the one or more interaction terminals;
      receive, from the one or more interaction terminals, authorization information associated with the automated information transfer;
      determine, based on the authorization information, whether the automated information transfer is authorized; and
      perform an action based on determining whether the automated information transfer is authorized.

2. The system of claim 1, wherein the one or more processors, to perform the action, are configured to:
   provide, to the user device and to the one or more interaction terminals, an approval indication, based on determining that the automated information transfer is at least one of authorized or conditionally authorized, that indicates that the automated information transfer is at least one of:
   approved,
   or
   conditionally approved.

3. The system of claim 1, wherein the one or more processors, to perform the action, are configured to:
   provide, to the user device and to the one or more interaction terminals, a not approved indication, based on determining that the automated information transfer is at least one of not authorized or conditionally not authorized, that indicates that the automated information transfer is at least one of:
   not approved,
   or
   conditionally not approved.

4. The system of claim 1, wherein the one or more processors, to perform the action, are configured to:
   approve the automated information transfer based on determining that the automated information transfer is authorized; and
   provide, to a server device and based on approving the automated information transfer, an indication of a confirmation associated with the automated information transfer.

5. The system of claim 1, wherein the authorization information includes item-specific data associated with one or more items that are associated with the automated information transfer.

6. The system of claim 1, wherein the one or more processors, to determine whether the automated information transfer is authorized, are configured to:
   verify value information, indicated by the authorization information, associated with one or more items that are associated with the automated information transfer.

7. The system of claim 1, wherein the one or more processors, to perform the action, are configured to:
   provide, to the user device and to the one or more interaction terminals, a request for additional information based on determining that the automated information transfer is at least one of:
   conditionally authorized, or
conditionally not authorized.

8. A non-transitory computer-readable medium for using location-based mapping to enable automated information transfer, the non-transitory computer-readable medium storing a set of instructions, the set of instructions comprising:
one or more instructions that, when executed by one or more processors of an automated information transfer system, cause the automated information transfer system to:
receive, from a user device, a request associated with the automated information transfer,
wherein the request indicates a location of the user device;
identify, based on the request and the location of the user device, one or more interacting entities that are associated with automated information transfer services within a threshold proximity of the location of the user device;
present, to the user device, a graphical user interface that enables selection, via a user input, of an interacting entity that is associated with the automated information transfer;
receive historical transaction records including one or more interaction terminal identifiers;
create, using the one or more interaction terminal identifiers, a mapping between physical locations associated with interacting entities and identifiers of interaction terminals that are present at each physical location of the physical locations;
identify, based on the selection of the interacting entity associated with the automated information transfer and based on the mapping, one or more interaction terminals at a physical location associated with the interacting entity;
provide, to the user device, one or more identifiers associated with the one or more interaction terminals;
receive, from the one or more interaction terminals, authorization information associated with the automated information transfer;
determine, based on the authorization information, whether the automated information transfer is authorized; and
perform an action based on determining whether the automated information transfer is authorized.

9. The non-transitory computer-readable medium of claim 8, wherein the one or more instructions, when executed by the one or more processors, further cause the automated information transfer system to:
provide, to the user device and to the one or more interaction terminals, an approval indication, based on determining that the automated information transfer is at least one of authorized or conditionally authorized, that indicates that the automated information transfer is at least one of:
approved,
or
conditionally approved.

10. The non-transitory computer-readable medium of claim 8, wherein the one or more instructions, when executed by the one or more processors, further cause the automated information transfer system to:
provide, to the user device and to the one or more interaction terminals, a not approved indication, based on determining that the automated information transfer is at least one of not authorized or conditionally not authorized, that indicates that the automated information transfer is at least one of:
not approved,
or
conditionally not approved.

11. The non-transitory computer-readable medium of claim 8, wherein the one or more instructions, when executed by the one or more processors, further cause the automated information transfer system to:
approve the automated information transfer based on determining that the automated information transfer is authorized; and
provide, to a server device and based on approving the automated information transfer, an indication of a confirmation associated with the automated information transfer.

12. The non-transitory computer-readable medium of claim 8, wherein the authorization information includes item-specific data associated with one or more items that are associated with the automated information transfer.

13. The non-transitory computer-readable medium of claim 8, wherein the one or more instructions, when executed by the one or more processors, further cause the automated information transfer system to:
verify value information, indicated by the authorization information, associated with one or more items that are associated with the automated information transfer.

14. The non-transitory computer-readable medium of claim 8, wherein the one or more instructions, when executed by the one or more processors, further cause the automated information transfer system to:
provide, to the user device and to the one or more interaction terminals, a request for additional information based on determining that the automated information transfer is at least one of:
conditionally authorized, or
conditionally not authorized.

15. A method for using location-based mapping to enable automated information transfer at a user location, comprising:
receiving, from a user device, a request associated with the automated information transfer,
wherein the request indicates a location of the user device;
identifying, based on the request and the location of the user device, one or more interacting entities that are associated with automated information transfer services within a threshold proximity of the location of the user device;
presenting, to the user device, a graphical user interface that enables selection, via a user input, of an interacting entity that is associated with the automated information transfer;
receiving historical transaction records including one or more interaction terminal identifiers;
creating, using the one or more interaction terminal identifiers, a mapping between physical locations associated with interacting entities and identifiers of interaction terminals that are present at each physical location of the physical locations;
identifying, based on the selection of the interacting entity associated with the automated information transfer and based on the mapping, one or more interaction terminals at a physical location associated with the interacting entity;
providing, to the user device, one or more identifiers associated with the one or more interaction terminals;

receiving, from the one or more interaction terminals, authorization information associated with the automated information transfer;

determining, based on the authorization information, whether the automated information transfer is authorized; and performing an action based on determining whether the automated information transfer is authorized.

16. The method of claim 15, wherein performing the action comprises:

providing, to the user device and to the one or more interaction terminals, an approval indication, based on determining that the automated information transfer is at least one of authorized or conditionally authorized, that indicates that the automated information transfer is at least one of:

approved, or conditionally approved.

17. The method of claim 15, wherein performing the action comprises:

providing, to the user device and to the one or more interaction terminals, a not approved indication, based on determining that the automated information transfer is at least one of not authorized or conditionally not authorized, that indicates that the automated information transfer is at least one of:

not approved, or conditionally not approved.

18. The method of claim 15, wherein performing the action comprises:

approving the automated information transfer based on determining that the automated information transfer is authorized; and providing, to a server device and based on approving the automated information transfer, an indication of a confirmation associated with the automated information transfer.

19. The method of claim 15, wherein the authorization information includes item-specific data associated with one or more items that are associated with the automated information transfer.

20. The method of claim 15, wherein determining whether the automated information transfer is authorized comprises:

verifying value information, indicated by the authorization information, associated with one or more items that are associated with the automated information transfer.

* * * * *